CULLIN W. REED, OF CHAGRIN FALLS, OHIO.

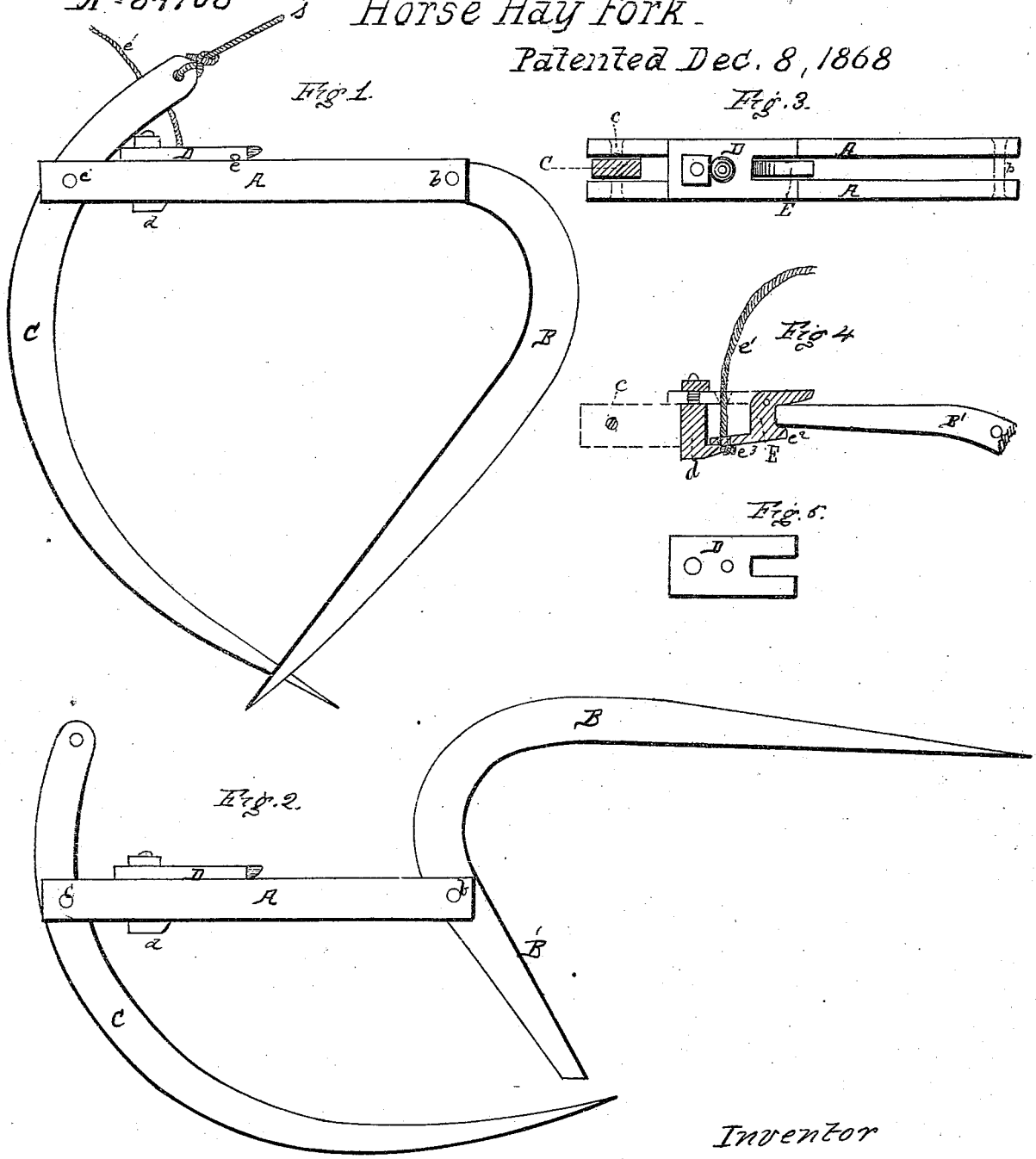

Letters Patent No. 84,708, dated December 8, 1868.

IMPROVEMENT IN HORSE HAY-FORKS.

The Schedule referred to in these Letters Patent and making part of the same.

Be it known that I, CULLIN W. REED, of Chagrin Falls, in the county of Cuyahoga, and State of Ohio, have invented certain new and useful Improvements in Horse Hay-Forks; and do hereby declare that the following is a full, clear, and exact description of the same, reference being had to the accompanying drawings, and to the letters of reference marked thereon, and making a part of this specification, in which—

Figure 1 is a plan view of a horse hay-fork, the tines in position as inserted in the hay.

Figure 2 is a plan view of a horse hay-fork, the tines unhitched.

Figure 3 is a face view of the cross-head bar.

Figure 4 is a sectional view, showing the action of the dog on the retaining-tine.

Figure 5 is a plan view of the upper plate and slots, which are attached to the cross-head bar.

My present invention is an improvement on the fork patented by me on the 24th day of December, 1867, whereby the operating-mechanism is much simplified, and the fork thereby rendered much more effective.

The nature of my invention consists in arranging, in an ordinary slotted cross-head or beam, made of either wrought or cast-iron, a hinged dog, so arranged and adjusted as to catch the free end of an independent tine, pivoted at the extreme end of the cross-head or beam, said tine being with an arm or lever which enters and plays in the snap-catch of the dog.

This action, in conjunction with an independent tine, pivoted at the opposite end of the cross-head or beam, in combination with an unshipping-rope or cord, enables me readily to insert or withdraw my device from the bundle or bale, the weight of the tine being sufficient, by its fall, to lock and hold the dog, independent of all complicated mechanism.

To enable others skilled in the art to make and use my invention, I will now proceed to describe its construction and operation.

A is a cross-head or beam, made either of cast-iron or wrought-iron, slotted its entire length.

To this cross-head or beam, by means of bolts or pivots, $b$ and $c$, I attach the tines B and C.

The tine B is provided with a lever-arm or bearing, $B^1$, which works in conjunction with a suitable dog, pivoted in the cross-head or beam A.

E is a dog which is pivoted and freely works in the cross-head or beam A. This dog is provided with an upper lip, $e$, and projecting flange $e^2$, the flange projecting beyond the main arm of the dog E in both directions; in one direction, sufficiently far to form the catch $e^2$, and in the other, to form the bearing-plate $e^3$, whereby it is retained in position.

D is a slotted plate on the cross-head or beam A, and is firmly secured thereto by means of lip-bolt $b$, the lip of the bolt forming the bearing-end or rest of the projecting plate $e^3$ of the dog.

To the free end of the tine C, I attach the hoisting-rope or cord, $c^1$.

In a suitable aperture or opening in the bearing-plate $e^3$, of the dog, I attach the unshipping-cord $e^1$ The operation is as follows:

The tines are inserted in the bundle or bale, as shown in fig. 1, when instantly the lever-end or arm of the tine B is caught and held by the dog E, as clearly shown in fig. 4. The bale or bundle is then elevated, by means of the hoisting-rope $c$, to the desired position, when instantly, by pulling on the unshipping-rope $e^1$, the tine B is immediately released, and the load safely deposited at the desired point.

Having thus fully described my invention, and the operation of the same,

What I claim as new therein, and desire to secure by Letters Patent of the United States, is—

The cross-head A, when the same is slotted its entire length, the pivoted hinged tines B and C, when the former is provided with a lever-arm, $B^1$, in combination with a dog, E, and the whole is so arranged as to operate substantially as described, and for the purpose specified.

In testimony whereof, I have signed my name to this specification, in the presence of two subscribing witnesses.

CULLIN W. REED.

Witnesses:
C. FORCE,
A. M. PHILLIPS.